(No Model.)
D. G. ZEIGLER.
HOEING MACHINE.
No. 330,765. Patented Nov. 17, 1885.
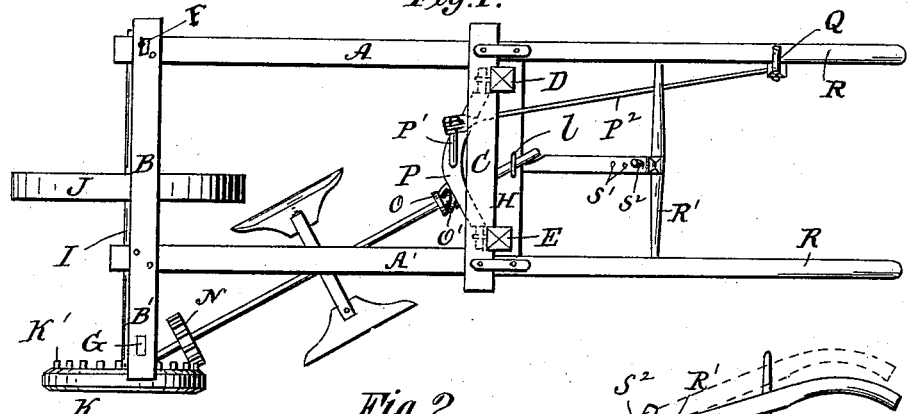
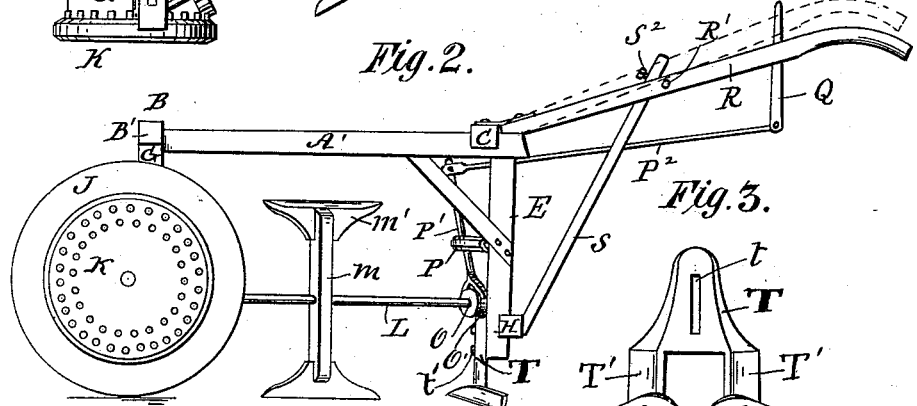
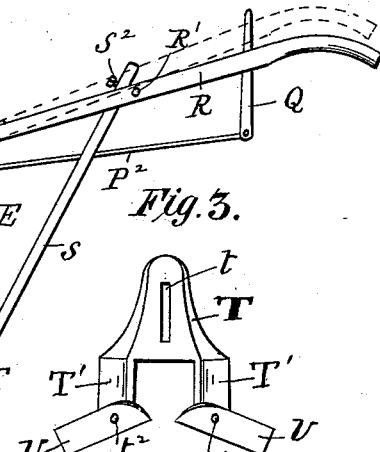
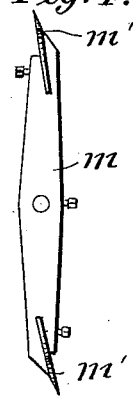
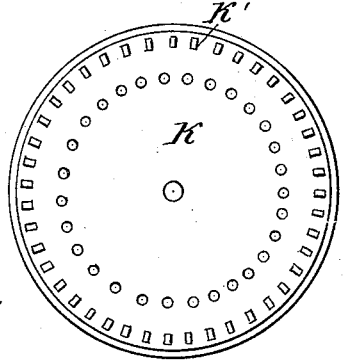
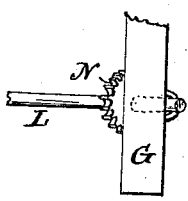
Witnesses
Saml R. Turner
P. B. Turpin
Inventor
Daniel G. Zeigler
By R. S. & A. P. Lacey
Att'ys

UNITED STATES PATENT OFFICE.

DANIEL G. ZEIGLER, OF ORANGEBURG COUNTY, ASSIGNOR OF ONE-HALF TO ROBERT COPES, OF ORANGEBURG, SOUTH CAROLINA.

HOEING-MACHINE.

SPECIFICATION forming part of Letters Patent No. 330,765, dated November 17, 1885.

Application filed March 12, 1885. Serial No. 158,598. (No model.)

*To all whom it may concern:*

Be it known that I, DANIEL G. ZEIGLER, a citizen of the United States, residing at my residence in the county of Orangeburg and State of South Carolina, have invented certain new and useful Improvements in Hoeing-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention is an improvement in that class of spading-machines commonly known as "cotton-choppers," and used for thinning out the crops of cotton, peas, corn, and similar seeds which are drilled or planted in rows.

The invention consists in certain novel constructions and combinations of parts which will be hereinafter more fully described and claimed.

In the drawings, Figure 1 is a top plan view, and Fig. 2 is a side view, of my machine. Fig. 3 is a detail front view of the scraper attachment. Fig. 4 is a detail edge view of the hoe-bar. Fig. 5 is a detail view of the drive-gear, and Fig. 6 is a front view of the framing.

The framing of the implement comprises side beams, A A', a front beam, B, extended at B' beyond the side beam, A', a back beam, C, and depending beams D, E, F, and G. The beams D E are fixed at their upper ends to the rear opposite corners of the top frame, composed of beams A, A', B, and C. A cross-beam, H, connects the beams D and E near their lower ends and serves a purpose presently described. The beams F G depend from the opposite ends of the beam B. To these beams F G, I journal the axle I, on which are secured the supporting and drive wheel J and the main gear K. The wheel J turns against the ground and transmits the motion so received to the shaft, which in turn communicates the motion to the main gear. This main gear is smaller than the drive-wheel, so it will be clear of the ground, and is provided with two circumferential rows of holes fitted to receive the stems of teeth K', which are removably inserted, so they may be changed from one to the other of the concentric rows in order to employ a larger or smaller pinion on the hoe-shaft, for the purpose of increasing or decreasing the speed, as may be desired. The shaft L is journaled in and movable through bearings *l l*, formed or supported, preferably, on the beams G and H, as shown. This shaft, it will be seen, is arranged at an angle to the line of motion of the machine, and the hoe-bar M is secured on it about midway its ends and provided with suitable hoes, M'. This bar M is so arranged by the angle of the shaft L that its hoes M' will strike the ground in a line between the wheels J and K, so that when operating on the row of plants the wheels J and K are on opposite sides of and clear of the plants.

On the shaft L', near its front end, I fix a pinion, N, which meshes with the gear K, and near its other end I provide the shaft L with a collar, O, having an annular groove, O'.

To the bars D E, I journal a bearing-bar, P, to which is fixed between its ends a lever P', the lower end of which is bifurcated or otherwise suitably formed to engage the collar O, and its upper end is connected by a link or rod, P², with a short hand-lever, Q, pivoted to one of the handle-bars in convenient reach of the operator. By operating this hand-lever Q, the shaft L may be moved so as to adjust its pinion out of mesh with the main gear when turning the machine or rounding stumps and rocks. The handles R R are hinged at their forward ends to the main frame, and are connected by a bar, R'. A bar, S, is attached at its lower end to the framing and has its upper end extended alongside the bar R', and provided with a series of holes, S', through which it may be connected by a set-screw, S², with bar R', so as to set the handle higher or lower to adjust it for use by men or boys of different heights. The hoes M' are secured to the bar M by set-screws or in other suitable manner so they can be readily removed for the purpose of applying larger or smaller hoes, as may be desired. The beam E is arranged to run in rear of the point where the hoes M' strike the ground. On this beam I support the scraper. The standard T of this scraper is formed near its upper end with a slot, *t*, elongated vertically, and fitted to receive a screw, *t'*, by which it is secured to the beam E, and so it may be set higher or lower, as desired. The lower end of the standard is bifurcated, forming an arch which extends over the plants. The arms T' of the standard are adapted at their lower ends to receive the shovels U, which are suitably secured to said arms and are inclined downward and rearward toward their outer ends. The points of these shovels rest sufficiently apart to run on opposite sides of the row of plants. By these hoes all weeds, grasses, and similar growths are scraped from alongside the row of plants, and the surface of the ground is smoothed and gently inclined away from the stems of the plants. Each shovel is attached by a single bolt, $t^2$, so that it may be removed and set on the opposite arm. When thus arranged, the two shovels will scrape the dirt away from and leave slight furrows or channels next the stems of the plants. It will be noticed that the rear bearing of the hoe-shaft is arranged approximately in line with the drive-wheel, and that such bearing receives in great part the strain of the operation of the hoe. By such relative arrangement all side draft is overcome and the draft is exerted directly in the line of greatest strain.

Having thus described my invention, what I claim, and desire to secure by Letters Patent, is—

1. The combination of the drive-shaft, the drive-wheel thereon, a main gear secured on the drive-shaft laterally to the drive-wheel, the hoe-shaft arranged at an angle to the line of draft, and provided with a pinion meshed with the drive-gear, and the hoe-bar secured on said shaft in line between the drive-wheel and main gear, substantially as set forth.

2. The combination of the drive shaft, a drive-wheel thereon, a main gear secured on the drive-shaft laterally to the drive-wheel, and a hoe-shaft provided at its forward end with a pinion meshed with the drive-gear, and having its rear end journaled to the framing approximately in line with the drive-wheel, substantially as set forth.

3. The combination, with the main frame and the driving mechanism, of the hoe-shaft arranged at an angle to the line of draft, the hoes secured to the said shaft, the adjustable bifurcated standard T, arranged in rear of the hoes, and the scrapers U, secured upon the arms of the said standard, substantially as and for the purposes set forth.

In testimony whereof I affix my signature in presence of two witnesses.

DANIEL G. ZEIGLER.

Witnesses:
WM. L. GLAZE,
W. L. IZLAR.